United States Patent [19]

Levecque et al.

[11] 4,347,070
[45] Aug. 31, 1982

[54] CONTROLS FOR TORATION FIBERIZATION

[75] Inventors: Marcel Levecque, Birchrunville, Pa.; Jean A. Battigelli; Dominique Plantard, both of Rantigny, France

[73] Assignee: Saint-Gobain Industries, Paris, France

[21] Appl. No.: 102,256

[22] Filed: Dec. 10, 1979

Related U.S. Application Data

[63] Continuation of Ser. No. 926,954, Jul. 20, 1978, Pat. No. 4,199,338, which is a continuation-in-part of Ser. No. 834,540, Sep. 19, 1977, Pat. No. 4,145,203, Ser. No. 762,789, Jan. 25, 1977, Pat. No. 4,102,662, and Ser. No. 676,755, Apr. 14, 1976, Pat. No. 4,118,213, said Ser. No. 762,789, and Ser. No. 676,755, each is a continuation-in-part of Ser. No. 557,282, Mar. 11, 1975, Pat. No. 4,015,964, which is a continuation-in-part of Ser. No. 353,984, Apr. 24, 1973, Pat. No. 3,885,940.

[30] Foreign Application Priority Data

Apr. 19, 1978 [FR] France .............................. 78 11488

[51] Int. Cl.$^3$ .............................................. C03B 37/04
[52] U.S. Cl. .............................................. 65/9; 65/16
[58] Field of Search .................................. 65/5, 9, 16

[56] References Cited

U.S. PATENT DOCUMENTS 4,102,662  7/1978  Levecque et al. ........................ 65/5
4,113,456  9/1978  Levecque et al. ........................ 65/5
4,145,203  3/1979  Levecque et al. ...................... 65/16
4,150,937  4/1979  Pelagio et al. ...................... 65/16 X

FOREIGN PATENT DOCUMENTS 724314  2/1955  United Kingdom .................... 65/16
411050  6/1974  U.S.S.R. ................................ 65/16

OTHER PUBLICATIONS

Glass and Ceramic (USA), vol. 28, #1-2 Multinozzle Head Chernopyator, Jan. Feb. 1971, pp. 117-118.

Primary Examiner—Robert L. Lindsay, Jr.
Attorney, Agent, or Firm—John T. Synnestvedt; Kenneth P. Synnestvedt

[57] ABSTRACT

Equipment is disclosed for gas blast attenuation of attenuable materials by the toration type of technique according to which a gaseous jet is directed transversely into a gaseous blast of larger cross section, thereby developing a zone of interaction of the jet and the blast into which a stream of the attenuable material is delivered. Each fiberizing center incorporates a plurality of components including means for generating the jet, means for generating the blast, and means for supplying the stream of attenuable material. In addition, the fiberizing center frequently also incorporates an additional structural element or means positioned along the path of the jet and influencing the jet flow. The disclosed equipment also includes control mechanism providing for shifting or altering the operative interrelation between various of the components at the fiberizing center, for the purpose of compensating for fluctuations in certain operating conditions arising for example from variations in temperature conditions, in composition of the material being attenuated, velocities of the jet and blast, and other variable factors encountered in operation.

7 Claims, 23 Drawing Figures

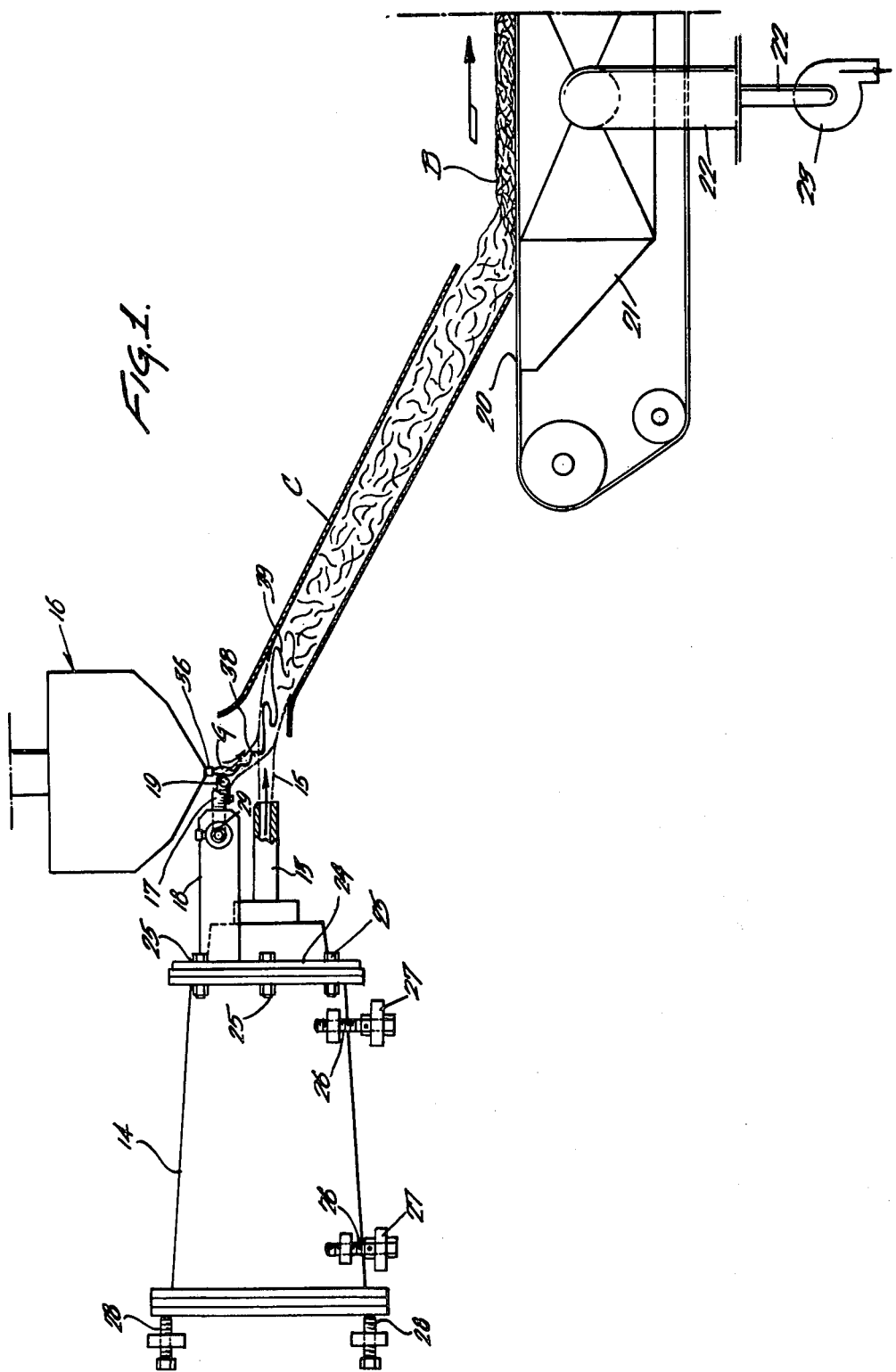

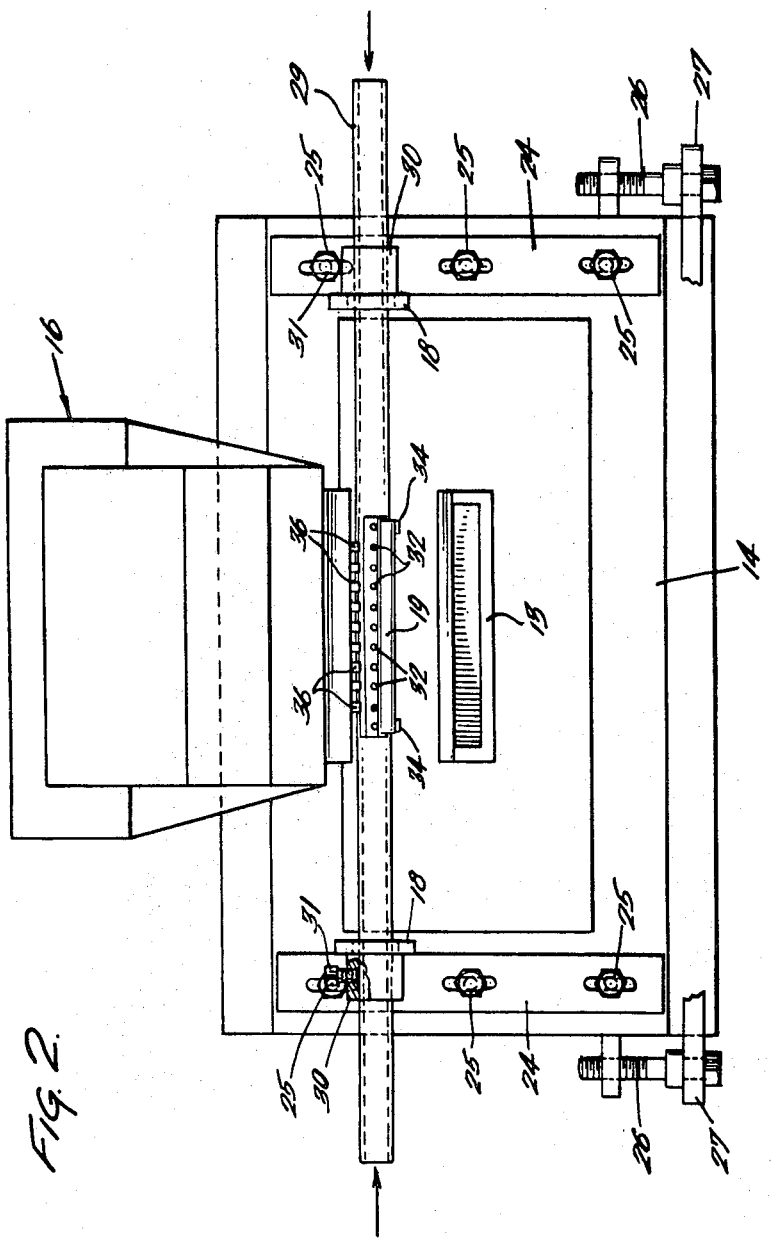

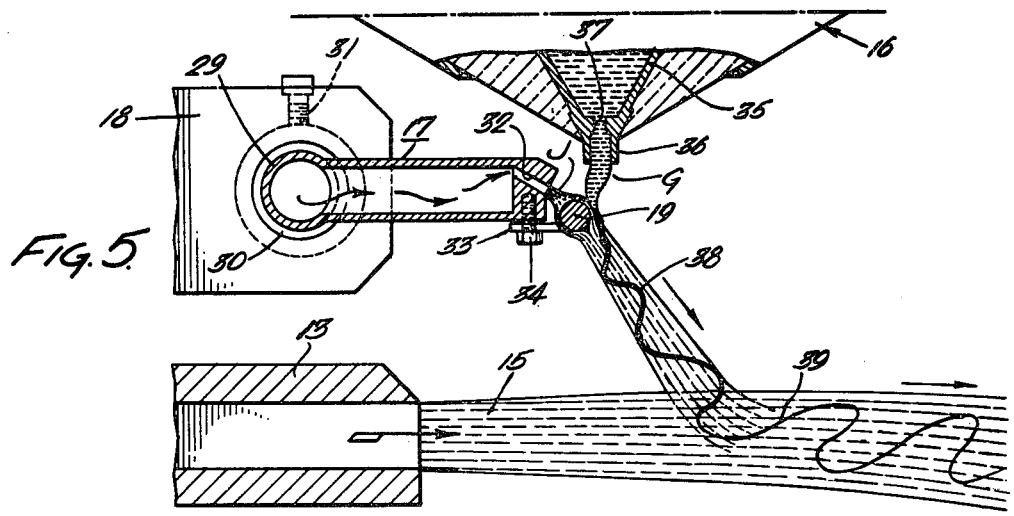
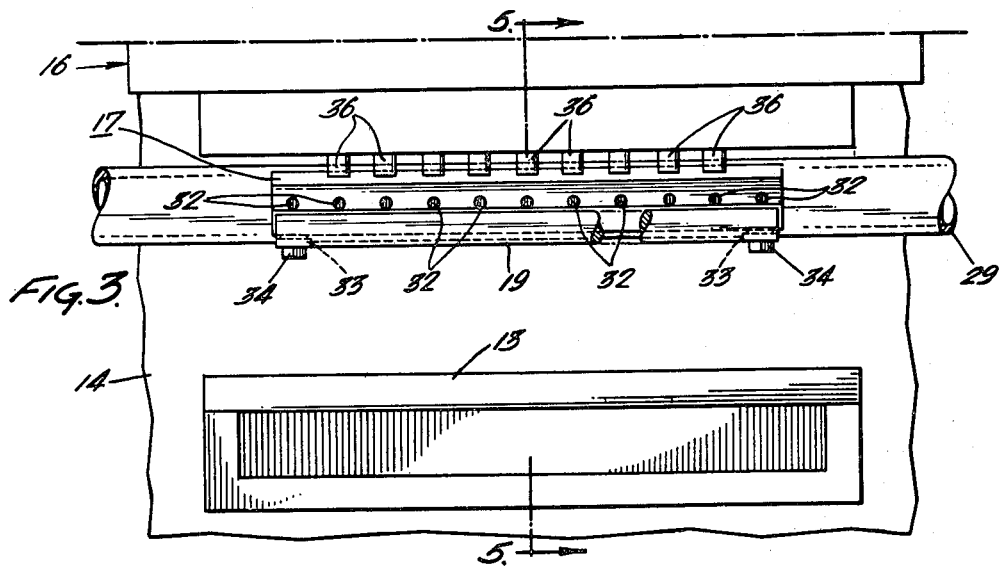
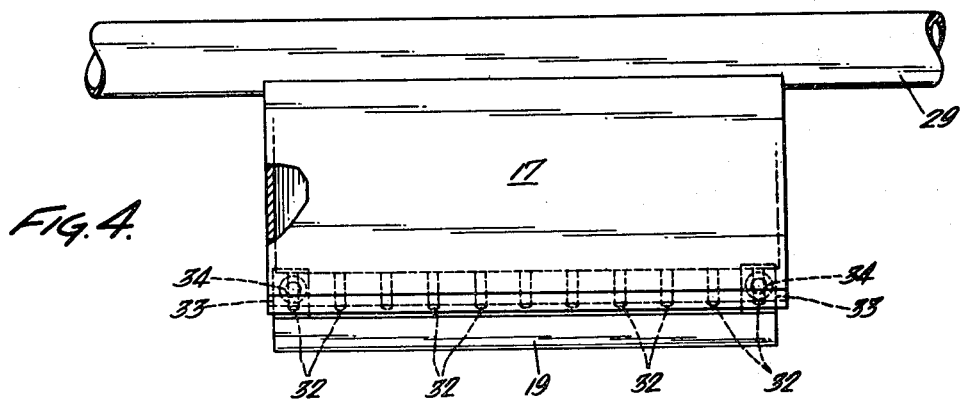

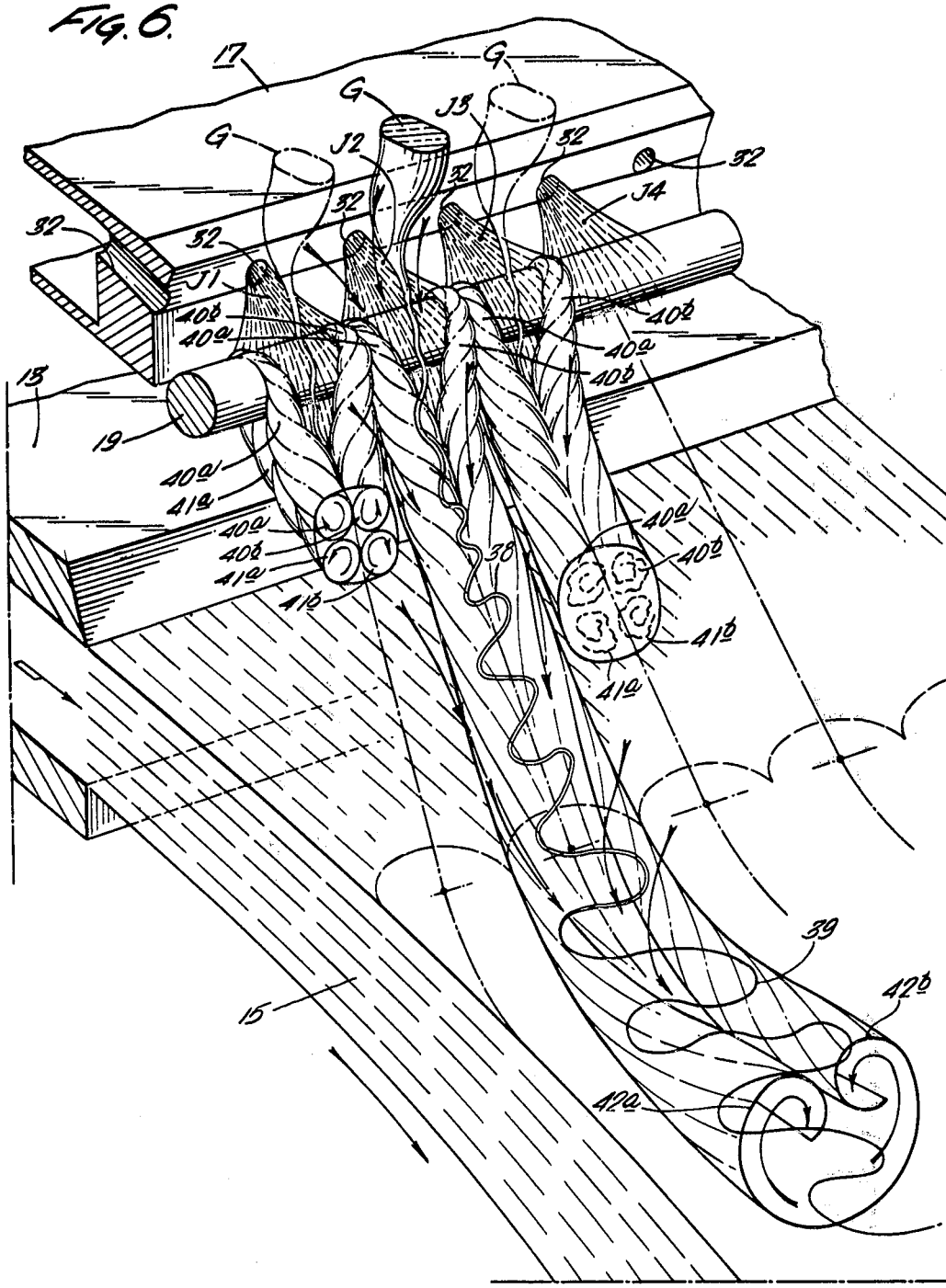

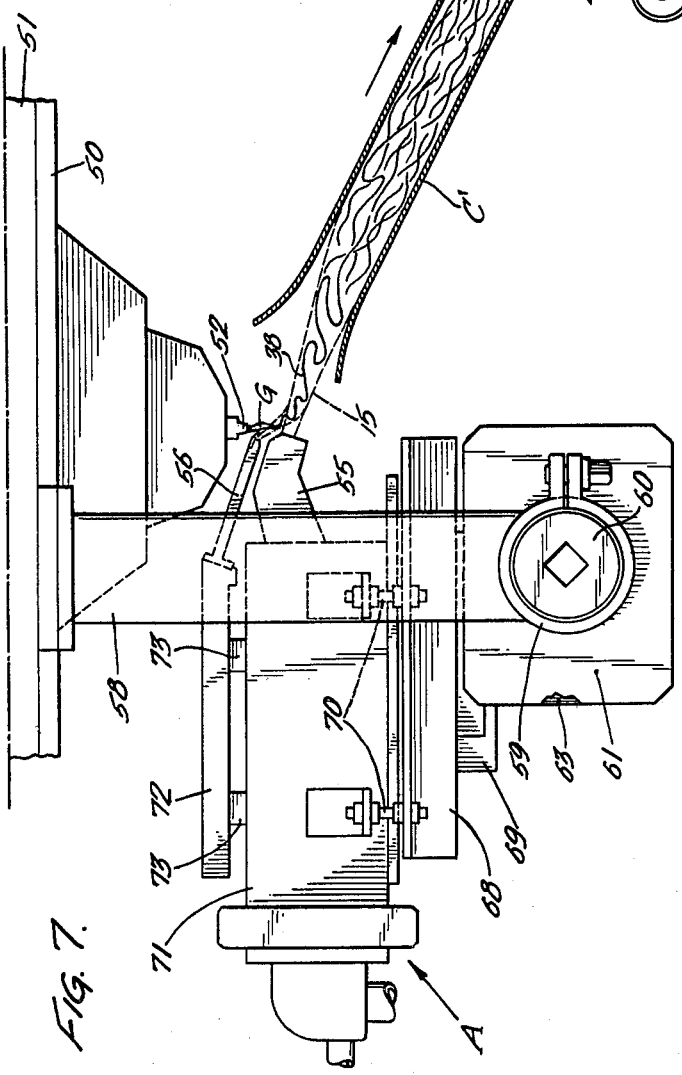
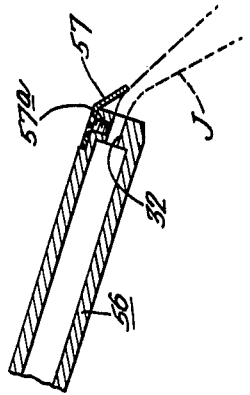
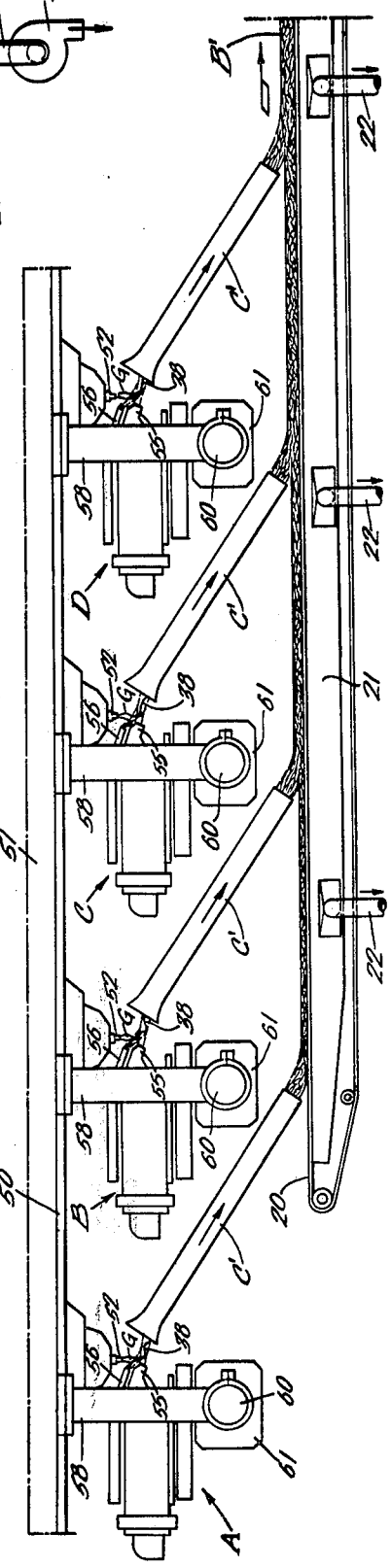
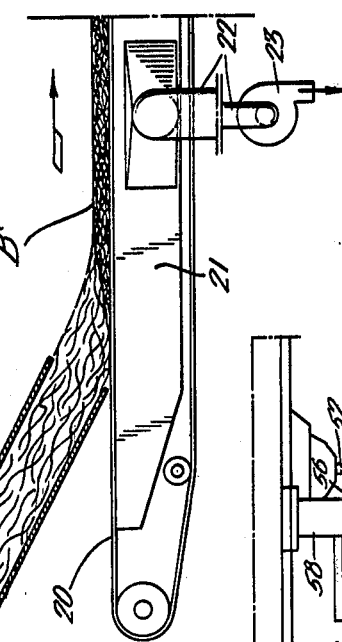

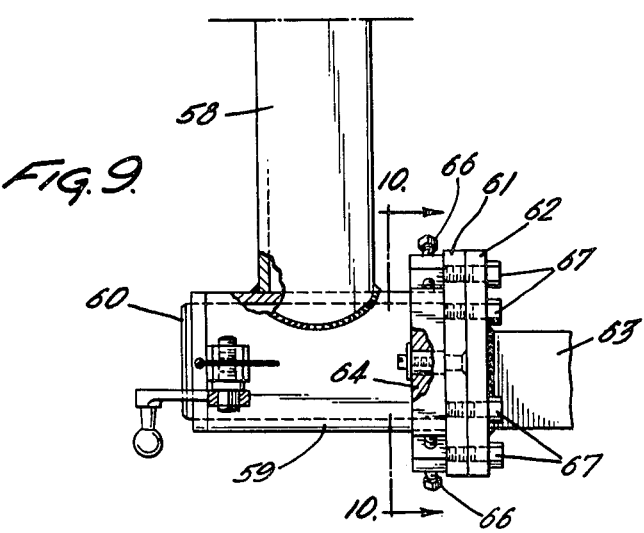
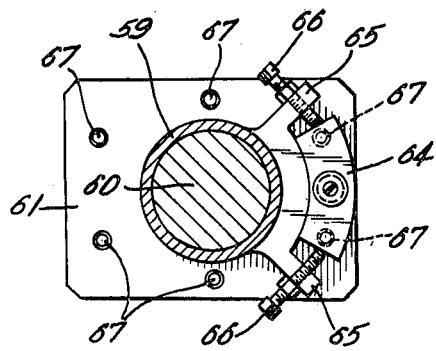
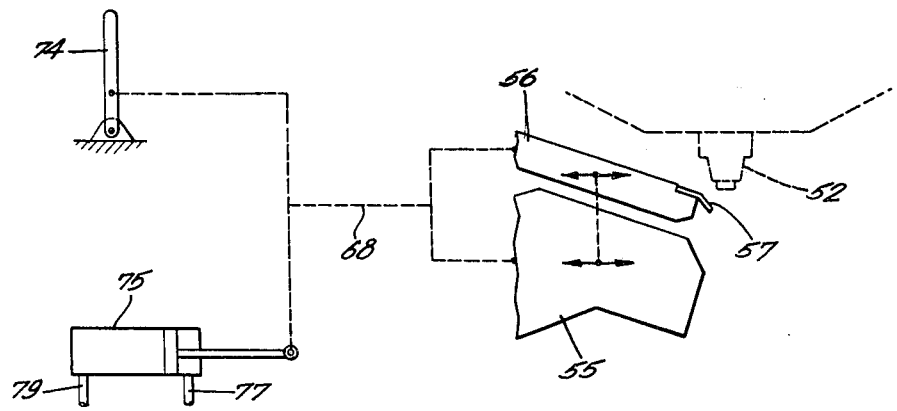
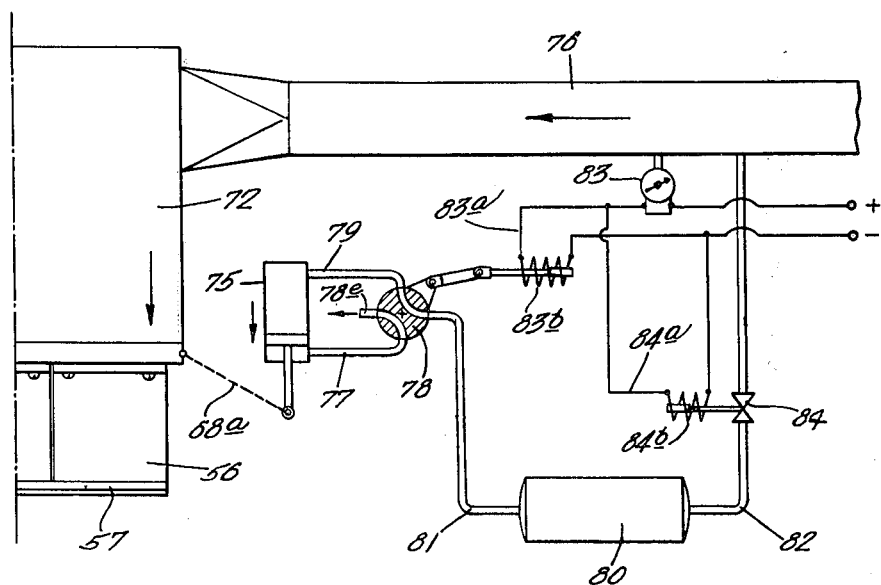

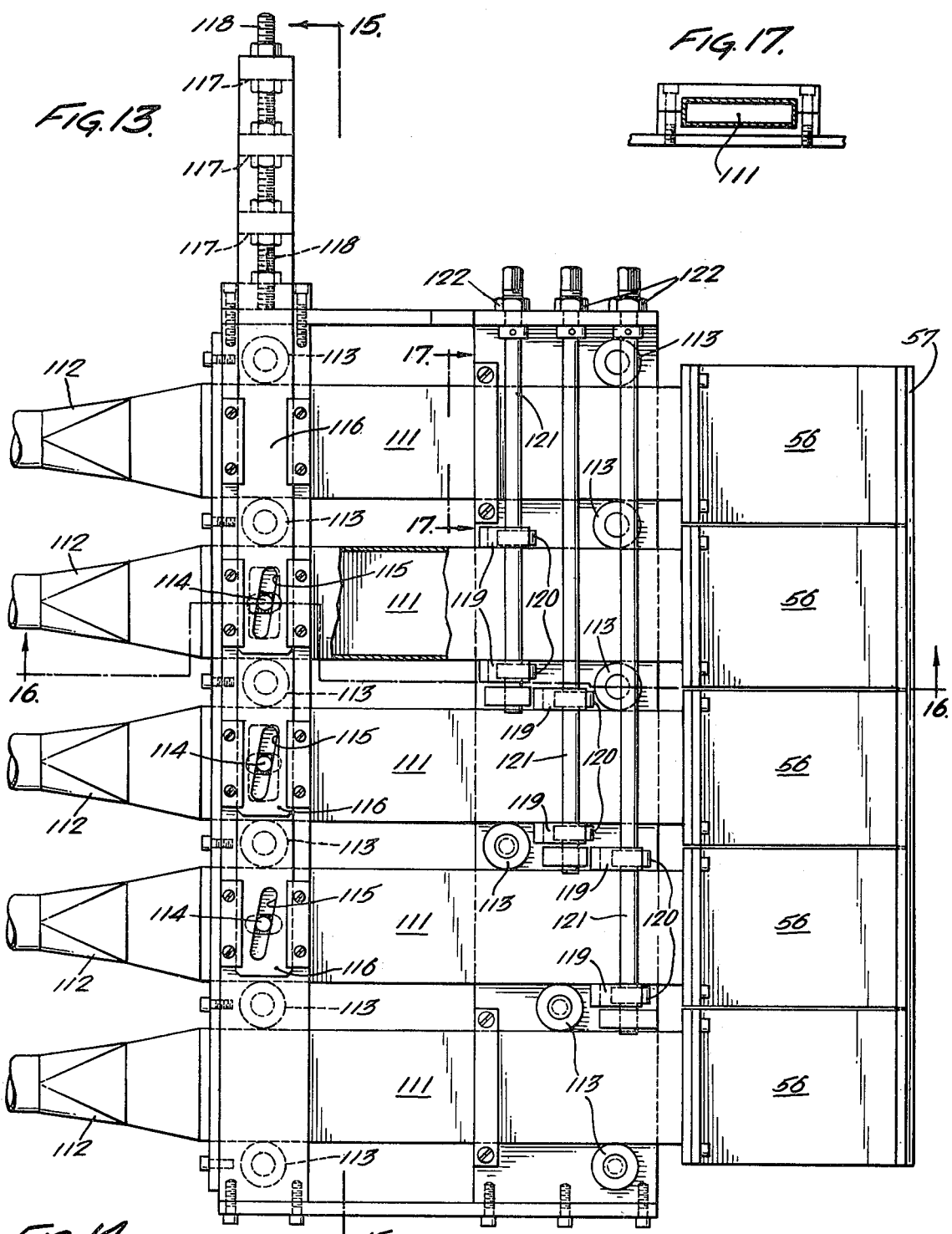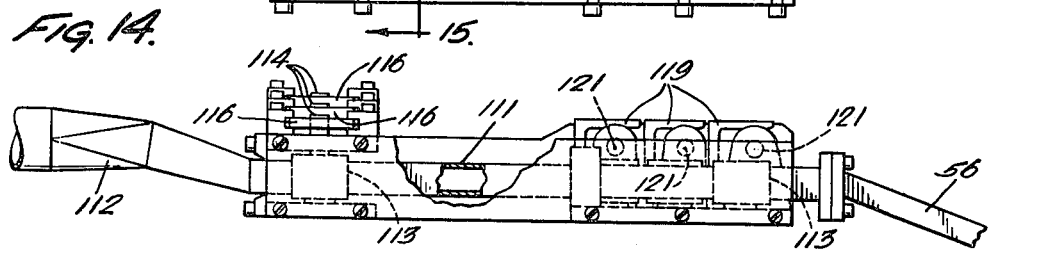

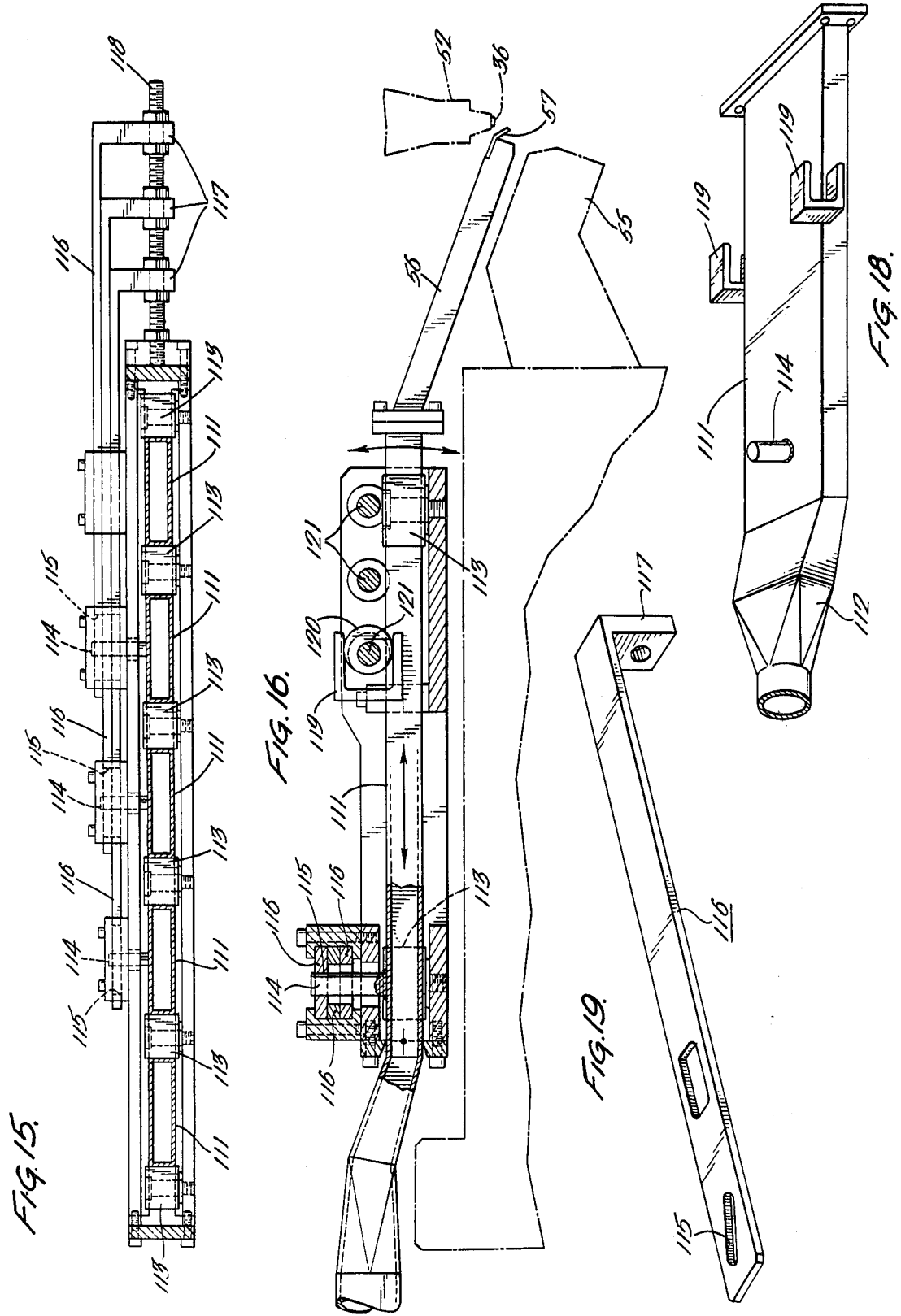

CONTROLS FOR TORATION FIBERIZATION

CROSS REFERENCES

The present application is a continuation of our application Ser. No. 926,954, filed July 20, 1978, and issued Apr. 22, 1980, as U.S. Pat. No. 4,199,338. Said prior application is a continuation-in-part of our applications Ser. No. 834,540, filed Sept. 19, 1977, issued Mar. 20, 1979, as U.S. Pat. No. 4,145,203, and Ser. No. 762,789, filed Jan. 25, 1977, issued July 25, 1978, as U.S. Pat. No. 4,102,662, and Ser. No. 676,755, filed Apr. 14, 1976, issued Oct. 3, 1978, as U.S. Pat. No. 4,118,213, which application Ser. Nos. 762,789 and 676,755 in turn are continuations-in-part of our application Ser. No. 557,282, filed Mar. 11, 1975, and issued Apr. 5, 1977, as U.S. Pat. No. 4,015,964, which, in its turn, is a continuation-in-part of our application Ser. No. 353,984, filed Apr. 24, 1973, and issued May 27, 1975, as U.S. Pat. No. 3,885,940 said Ser. No. 762,789 is a continuation-in-part of Ser. No. 557,282 which is a continuation-in-part of Ser. No. 353,984.

BACKGROUND AND OBJECTS

This invention relates to the formation of fibers from attenuable material and while the invention is adapted for use in the formation of fibers from a wide variety of attenuable materials, it is particularly suited to the attenuation of various thermoplastic materials, especially mineral materials such as glass and similar compositions which are rendered molten by heating. As with the techniques of the prior applications Ser. No. 834,540 and Ser. No. 762,789, the present invention may be employed in connection not only with various mineral materials, but also with certain organic materials which are attenuable, such as polystyrene, polypropylene, polycarbonate and polyamides. Since the equipment or apparatus is especially useful in the attenuation of glass and similar thermoplastic materials, the following description refers to the use of glass by way of illustration.

Certain techniques for utilizing whirling currents or tornadoes for the attenuation of molten glass have been disclosed by us in prior applications above identified, such techniques being identified as toration. For example, U.S. Pat. No. 3,885,940, above identified, and also the companion U.S. Pat. No. 3,874,886, disclose development of pairs of counter-rotating tornadoes by directing a gaseous jet into a larger gaseous blast, thereby creating a zone of interaction including pairs of such tornadoes, and into which zone a stream of molten glass is delivered, with resultant attenuation of the glass stream.

In the equipment illustrated in said prior U.S. patents just mentioned, the orifice from which the glass stream is delivered to the zone of interaction is located at or adjacent to the boundary of the blast. In our prior application Ser. No. 557,282, now U.S. Pat. No. 4,015,964, toration arrangements are disclosed in which the glass orifice is positioned in spaced relation to the boundary of the blast, and in which the glass stream is delivered by gravity to the zone of interaction established by the interaction of a jet and a larger blast.

In prior applications Ser. Nos. 834,540, 762,789 and 676,755, both the glass orifices and the jet orifices are spaced from the boundary of the blast, and the glass streams are delivered by the action of the jets into zones of interaction of the jets with the blast. In the applications just mentioned, the glass streams are also subjected to two stages of attenuation, one stage occurring in the jet and the other in the blast.

Still further in our applications Ser. No. 834,540 and Ser. No. 762,789, the secondary or carrier jet which delivers the glass into the zone of interaction with the blast is caused to develop a stable zone of laminar flow lying between a pair of counter-rotating whirls or tornadoes, and the glass stream is delivered to the laminar zone and thereafter enters the region of the tornadoes of the carrier jet, which latter merge downstream of the carrier jet, but before the carrier jet reaches the principal blast. As is pointed out in our applications Ser. No. 834,540 and Ser. No. 762,789, the operation just described results in a two-stage attenuation, the first stage taking place as the glass stream is advanced into the influence of the tornadoes of the carrier jet, and the second stage taking place after the carrier jet and the partially attenuated stream is delivered into the zone of interaction of the carrier jet with the blast.

According to the disclosure of said applications Ser. No. 834,540 and Ser. No. 762,789, the zone of laminar flow and the tornadoes of the carrier jet are developed as a result of deflection of the carrier jet and, as further brought out, such deflection of the carrier jet contributes stability of operation, notwithstanding the delivery of the glass to the carrier jet at a point spaced from the principal blast. Numerous other advantages of these techniques are also pointed out in applications Ser. Nos. 834,540 and 762,789.

Various of the controls provided according to the present invention are applicable to any of the foregoing configurations of equipment for fiberization. In some of the configurations of the equipment, only three primary components are present in each fiberizing center, namely, the means for generating the jet, the means for generating the blast and the means for delivering the stream of attenuable material into the zone of interaction between the jet and the blast, but in the configuration of the equipment according to application Ser. No. 834,540 and Ser. No. 762,789, there are four components involved in each fiberizing center, including the three just mentioned, and also a device for influencing the jet flow.

Although various of the controls are applicable to and useful in equipment incorporating only the three basic components at each fiberizing center, certain of the controls of the invention are of special advantage where the fourth component is also present in each fiberizing center, for reasons which will appear more fully as this description proceeds.

It is a general objective of the present invention to provide novel arrangements for mounting the components of the fiberizing centers, including adjustable devices or controls for altering the relative effective operating interrelation between the several components of each fiberizing center, and especially for altering the angular and displacement interrelation or position of certain of the components with relation to the means for delivering the stream of attenuable material. This is of special advantage in installations adapted to the fiberization of thermoplastic mineral materials such as glass, particularly where the glass is supplied from a forehearth or other melting furnace. Indeed, in the preferred embodiment according to the present invention, most of the controls function in a manner to adjust the operating interrelation between one or more of the jet generator, the blast generator, and the means for influencing the jet flow (where this latter means is also present), with respect to the bushing or other apparatus employed for delivering a stream or streams of attenuable material from a melting furnace or other supply means for the attenuable material.

In providing for the controls referred to, it is also an objective of the invention to compensate for fluctuations in various operating conditions such as the temperature of the several components of the system, the composition and viscosity of the attenuable material, the velocities of the gases used for the jet and blast, and other variable operating conditions. Warpage or irregularities in the shape or dimensions of components may also be compensated for by use of the controls disclosed.

Although certain of the controls contemplated according to the invention are disclosed in a form in which temporary shut-down of the equipment would be required in order to make an adjustment, for the most part, it is contemplated according to the invention that at least most of the controls be capable of operation during fiberization and without shut-down of the equipment.

Having in mind that the various components of the fiberizing centers are relatively closely coupled to each other, it is also an objective of the invention to provide for automatic withdrawal or displacement of certain components away from the supply means for the molten material, in case of failure of the gas supply to at least one of the devices for generating the jet and the blast. In this way, damage to various components is avoided.

BRIEF DESCRIPTION OF THE DRAWINGS

In the drawings,

FIGS. 1 to 6 inclusive illustrate one embodiment;

FIGS. 7 to 12 inclusive illustrate a second embodiment;

FIGS. 13 to 21 inclusive illustrate a third embodiment; and

FIGS. 1 TO 6

FIG. 1 is a somewhat diagrammatic elevational view of the major fiber producing and fiber collecting components of a system of the type shown in our prior application Ser. No. 834,540, with certain parts shown in vertical section;

FIG. 2 is an enlarged elevational view of the major fiber producing components shown in FIG. 1, this view being taken from the right of FIG. 1, but with the fiber collecting components removed;

FIG. 3 is a further enlarged elevational view of certain portions of the equipment shown in FIG. 2;

FIG. 4 is a plan view of some of the components shown in FIG. 3;

FIG. 5 is a vertical sectional view of the fiber producing components illustrated in FIGS. 3 and 4, this view being taken on section line 5—5 in FIG. 3; and FIG. 6 is a perspective diagrammatic view illustrating the fiberizing operation of the equipment shown in FIGS. 1 to 5 inclusive.

FIGS. 7 TO 12

FIG. 7 is an elevational view similar to FIG. 1 but illustrating the overall arrangement of the second embodiment and the mounting in association with a forehearth for glass or other mineral material;

FIG. 7a is an enlarged fragmentary detailed view illustrating a jet manifold box with a deflector plate mounted thereon, of the kind disclosed in our co-pending application Ser. No. 762,789 filed Jan. 25, 1977;

FIG. 8 is an elevational view on a reduced scale as compared with FIG. 7, showing in outline an installation embodying four fiberizing stations of the kind shown in FIG. 7 and all associated with a common fiber collecting device and forehearth structure;

FIG. 9 is a fragmentary elevational view of a portion of the equipment shown in FIG. 7;

FIG. 10 is a vertical sectional view with some parts shown in elevation, taken in general as indicated by the section line 10—10 on FIG. 9;

FIG. 11 is a diagrammatic view of certain controls preferably employed for the equipment shown in FIGS. 7 to 10.

FIG. 12 is a view diagrammatically illustrating portions of an automatic control system including mechanism for effecting automatic retraction of certain components away from the bushing or glass supply means.

FIGS. 13 TO 21

FIG. 13 is a view illustrating in plan a group of five jet manifold boxes such as shown in FIGS. 7, 7a and 12, a jet deflector being associated with the manifold boxes, and the Figure further showing mounting arrangements for the jet manifold boxes providing for flexure of the deflector by adjustment movements of the manifold boxes, thereby providing for adjustment of the operating interrelation between the deflector and the bushing for supplying streams of attenuable material for fiberization;

FIG. 14 is an end elevational view of equipment shown in FIG. 13;

FIG. 15 is a sectional view taken as indicated by the section line 15—15 on FIG. 13;

FIG. 16 is a sectional view taken generally as indicated by the broken line 16—16 on FIG. 13;

FIG. 17 is a sectional detailed view taken as indicated by the line 17—17 on FIG. 13;

FIG. 18 is a fragmentary perspective view of a portion of the mounting structure for one of the jet boxes;

FIG. 19 is a perspective view of one of the control elements incorporated in the structure of this embodiment; and FIGS. 20 and 21 are somewhat diagrammatic views representing the senses of deflector flexure control provided by the equipment of this embodiment.

FIG. 22

FIG. 22 is a view similar to FIG. 7, but illustrating controls applied to three component fiberizing centers instead of four component centers as in FIG. 7.

FIGS. 1 TO 6

Figure 20:
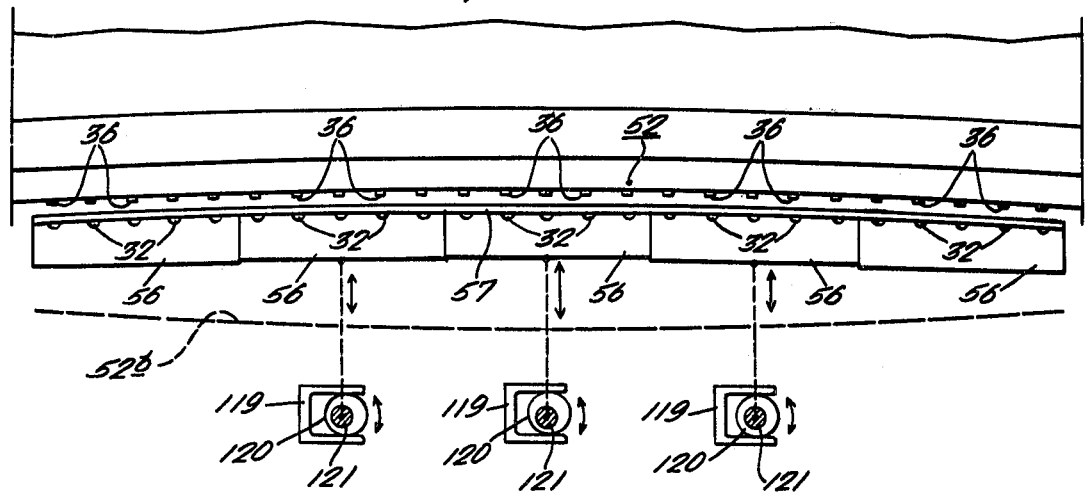

Turning first to the embodiment of the invention of FIGS. 1 to 6 attention is first directed to the overall outline view of FIG. 1. A blast delivery means is indicated at 13, this device being associated with the burner or blast generator 14. The principal jet or blast 15 is delivered from the device 13 in a generally horizontal direction below a glass supply means indicated in outline at 16. Secondary or carrier jets are delivered from nozzles or orifices associated with the gas supply means 17 which is mounted upon brackets 18. The secondary jets are directed toward the deflector element indicated at 19 and the carrier jets are thereby deflected in a downward direction to penetrate the blast 15 and develop zones of interaction. Individual streams of glass are supplied from the supply means 16 and these streams, are delivered to the secondary jets and are carried thereby into the zone of interaction with the blast, with resultant fiberization. The merged current of the jets and blast, together with the attenuated fibers enter the guide or chute C which is inclined downwardly toward the right as viewed in FIG. 1 for delivery of the fibers onto the surface of a perforate fiber collecting belt or conveyor 20. Suction boxes such as indicated at 21 are advantageously located below the upper run of the conveyor 20 and by means of ducts and fans diagrammatically indicated at 22 and 23, the fibers are collected in the form of a blanket indicated at B.

As seen in FIGS. 1 and 2, brackets 18 for mounting the secondary jets are connected with mounting straps 24 having slotted apertures cooperating with bolts 25 providing for vertical adjustment of the brackets 18 with respect to the main body of the blast generator 14, thereby providing for relative vertical adjustment of the jet mounting brackets and thus of the jets, with respect to the blast generator and thus with respect to the blast 15 itself.

Preferably also, the main body of the blast generator 14 and thus also the jet mounting brackets 18 and jets, are mounted for vertical adjustment by means of screw jacks indicated at 26 associated with fixed structure 27. By this means, the blast and the jet producing devices may be conjointly moved in the vertical direction and thereby provide for vertical adjustment with respect to the glass supply means 16 and the fiber directing duct C. Still further, the horizontal position of this entire assembly of parts may be adjusted by means of suitable jack screw devices diagrammatically indicated at 28 in FIG. 1. Provision is further made for certain other adjustments of parts associated with the jet generators and the jet deflectors, as will be described hereinafter with reference to some of the enlarged figures.

Turning now to the enlarged illustration of the fiberizing components as shown in FIGS. 2, 3, 4 and 5, it is first noted that the means or manifold indicated at 17 for supplying gas to the secondary jets is supported by means of sockets 30 which, in turn, are connected with the brackets 18. In this way, the jet supply device 17 may be angularly shifted upwardly or downwardly about the axis of the tube 29 and may be fixed in any desired position, for instance by set screws such as indicated at 31.

In addition to this angular upward and downward movement of the jet supply device 17, the mounting arrangement just described also provides for lateral shifting movement or adjustment of the device 17 in a direction parallelling the axis of the supporting tube 29. This adjustment is of importance in order to provide for accurate alignment of the carrier jets with respect to the glass orifices to be described hereinafter.

The device 17, in effect, comprises a manifold for feeding the individual jet orifices indicated at 32, there being 11 of such orifices in the embodiment here illustrated. As clearly appears in FIG. 5, the jet orifices have their axes inclined downwardly to the right toward the surface of the deflector 19. In this embodiment, the deflector 19 takes the form of a cylindrical rod having a surface convexly curved about an axis transverse to the stream of attenuable material. This rod has mounting tabs 33 secured to opposite ends thereof and connected with the body of the jet supply manifold 17 by means of bolts 34. The vertical position of the deflecting rod 19 with relation to the jet supply manifold 17 and thus in relation to the jets, may be adjusted by the insertion or removal of shims between the mounting tabs 33 and the bottom of the manifold 17. In addition, the apertures in the tabs 33 may be of elongated shape, to provide for adjustment of the position of the deflector rod in a horizontal direction. This provides for adjustment of the position of the deflector 19 in a direction generally toward and away from the jet generating means or toward and away from the stream of glass.

The glass supply means 16 includes a bushing 35 with a series of glass delivery devices 36, each of which is fed by a metering orifice 37. The glass is thus supplied in a series of streams or glass bulbs G to the secondary jets in which the streams are partially attenuated, as indicated at 38 in FIG. 5, and the partially attenuated streams enter the zone of interaction of the jets with the blast, with resultant additional attenuation as indicated at 39 in FIG. 5. From FIG. 3, it will be observed that there are nine glass delivery devices 36, and that the total number (eleven) of jet orifices 32 is greater than the number of glass delivery orifices so that an "outboard" jet may be positioned at each end of the series, in order to provide uniform fiberizing conditions for each of the nine glass streams employed in this embodiment.

The fiberizing operation provided by the equipment described above in relation to FIGS. 1 to 5 is illustrated schematically in FIG. 6. In considering this figure, it is first pointed out that the cylindrical deflector or rod 19 is shown as positioned with its axis offset somewhat downwardly from the center of the individual secondary jets J delivered from the jet orifices 32. This positioning appears in connection with each of a series of four of the secondary jets J1, J2, J3 and J4. The flow of each of the carrier jets J is divided into upper and lower portions, the upper portion flowing around the upper surface of the rod 19 and the lower portion around the lower surface of the rod 19. The rod effects a deflection of the first portion of the flow of the jet as it comes into contact with the rod, and the latter portion of the flow on the surface of the rod results in a Coanda effect. Because the center of the rod 19 is positioned below the axis of the jet orifices, the upper portion of the jet flow is of larger section than the lower portion, and this is desirable for reasons which will appear as this description proceeds.

The portions of the secondary jet flow above and below the rod 19 merge with each other in a position toward the side of the rod 19 generally opposite to the jet orifice 32.

As seen in FIG. 6, the jet flow from each of the orifices 32 also spreads laterally or diverges in the axial direction of the deflector 19, and with appropriate spacing of the jets, the lateral spreading or divergence results in impingement of adjoining jets upon each other, and this occurs as the upper and lower portions of the jets flow around the upper and lower surfaces of the rod 19.

This lateral impingement of the adjoining jets upon each other results in the development of pairs of counter-rotating whirls or tornadoes which have their points of origin or apices at the surface of the rod 19. As will be seen from FIG. 6, two pairs of tornadoes develop from the flow of each jet. Thus, an upper pair 40a and 40b develop from the portion of the jet flow which passes over the upper surface of the rod 19, and a lower pair 41a and 41b develop from the portion of the jet flow which passes under the lower surface of the rod 19. Each of these pairs of tornadoes are counter-rotating, the directions of rotation of the upper pair being downwardly at their adjoining sides and upwardly at their outer sides. On the other hand, the directions of rotation of the tornadoes of the lower pair is upwardly at their adjoining sides and downwardly at their outer sides.

Because of the positioning of the guide rod 19 in offset relation to the axis of each jet, the portion of the flow with the resultant tornadoes above the rod is larger and therefore more effective than the portion of the flow and tornadoes below the rod. In addition, this positioning of the rod 19 with relation to the jets also results in the development of a highly stable and effective area of substantially laminar flow on the upper side of the rod between the upper pair of tornadoes 40a and 40b. This area of laminar flow is generally triangular in shape, because the upper pair of tornadoes increase in size in the downstream direction of the flow. Indeed, the upper pair of tornadoes increase in size until they merge, as is clearly indicated in FIG. 6. The lower pair of tornadoes also increase in size and ultimately merge, as will be apparent in FIG. 6 from the tornadoes illustrated as associated with the jet J1. As the jet flow including the associated with the jet J1. As the jet flow including the associated tornadoes progresses still further, the tornadoes tend to lose their identity, as is indicated by the section of the jet flow originating from the jet J3 in FIG. 6. The merged flow of each jet, including the pairs of tornadoes originating with that jet, retain sufficient kinetic energy per unit of volume in relation to the kinetic energy of the principal blast, to cause penetration of the principal blast 15, and this penetration of the blast by each jet creates a zone of interaction of the type fully explained in our issued U.S. Pat. No. 3,885,940 above identified. Such a zone of interaction is characterized by the development of a pair of counter-rotating whirls or tornadoes 42a and 42b (see FIG. 6). Indeed, in the region of penetration of the jets into the blast, the flow and velocity of each jet is still sufficiently concentrated near the center of each jet so that each jet acts individually to develop a zone of interaction in the blast.

The flow of the secondary jets J1, J2, etc. is utilized to effect fiber formation, from the streams of the attenuable material, such as glass. The feed of this material is effected by the development of glass bulbs such as indicated at G, which are discharged from the devices 36, and from which individual streams of glass are delivered into the laminar flow areas of the jets lying between the pairs of upper tornadoes, as is clearly shown at FIG. 6. Because of the flow characteristics in this region above the guide rod 19, a very substantial air induction occurs, as is indicated by the arrows in FIG. 6 in association with the flow of jet J2. The induced air assists in drawing a stream of the glass from each glass bulb G delivering that stream in a stable manner into the zone of laminar flow between the pair of tornadoes of each fiberizing center. The whirling currents of the tornadoes then advance the stream and initiate the attenuation thereof, as is indicated at 38 in FIGS. 5 and 6.

The partially attenuated fiber, together with the jet flow, then progresses downwardly to penetrate the blast 15 and thereby deliver the partially attenuated fiber into the zone of interaction between the jet and the blast, and in this zone or region the additional counter-rotating tornadoes 42a and 42b effect further attenuation of the fiber, which may then be delivered to a collection system, for example in the manner illustrated in FIG. 1, including the use of a chute 19 and collection conveyor 20.

Although the development of the zones of laminar flow assist in providing stable introduction of the streams of glass into the fiberizing centers, variations in operating conditions tend from time to time to require change in the operating interrelationship between various of the components of the fiberizing centers. Certain control devices for effecting such alterations in the operating interrelationships between the components of the fiberizing centers have already been described above. With some of these control devices, for instance, the adjustment devices 26-27, 28 and 29-31 shown in FIG. 1 may be operated without shut-down of the fiberization operation, but certain other of the controls or adjustments, for instance, the positioning of the deflector rod 19 with relation to the jet orifices by means of the parts indicated at 33-34 would require shut-down of the fiberizing operation, with the equipment in the form as illustrated in FIGS. 1 to 6. However, it is to be understood that any of these controls may be arranged for operation without shut-down of the fiberizing center. This may be done in a variety of ways, some of which are indicated in the embodiments hereinafter described.

FIGS. 7 TO 12

In the second embodiment as shown in FIGS. 7 to 12, and described hereinafter, still further convenience in effecting control adjustments is provided not only for some of the senses of control which may be effected by the equipment of FIGS. 1 to 6, but also in other senses of control, as will further appear.

In the following description of the second embodiment, reference is first made to FIGS. 7, 7a and 8. In these figures, a foraminous fiber collecting conveyor is illustrated of the general kind shown in FIG. 1 at 20, the conveyor having suction boxes 21 associated therewith with suction connections 22 for pressure reduction so as to assist in fiber laydown.

A supporting structure appears at 50 for a furnace forehearth shown at 51, and as seen in FIG. 8 a series of bushings 52 is associated with the forehearth.

Equipment for establishing four fiberizing positions along the forehearth is indicated in FIG. 8. The equipment at each position is identified generally by a letter A, B, C, D and one of these is shown in FIG. 7 enlarged as compared with the scale of FIG. 8. At each station, the equipment includes various parts providing for the establishment of a multiplicity of fiberizing centers. Thus, at each station a bushing 52 elongated in the direction perpendicular to the plane of the drawing, is provided with a multiplicity of individual tips for delivery of streams or bulbs of the molten attenuable material.

Each station also includes at least one blast generator and blast delivery nozzle, the latter being indicated at 55, the blast itself being shown at 15, as in the first embodiment.

At each fiberizing station, there is also provided a series of jet manifold boxes 56, one of which is fragmentarily shown in section in FIG. 7a, and each of these manifold boxes is provided with a series of jet orifices 32 as appears in FIG. 7a. FIG. 7a further shows the sectional configuration of a deflector strip 57 which is fastened to the jet manifold box 56 by screws such as indicated at 57a. The jet itself is indicated at J and the action of the deflector 57 on the jet is indicated in FIG. 7a. The fiber 38 produced at each fiberizing center is directed, along with fibers produced at the adjoining fiberizing centers, into and through the chute C' for laydown of the fiber blanket B' as appears in FIG. 7.

The blast nozzle 55, the jet boxes 56 and the deflector or deflectors 57 carried thereby are interconnected and associated with each other at each fiberizing station by means of various of the mounting and control mechanisms hereinafter described, and all of this equipment, including the control mechanisms are unitarily mounted for each fiberizing station. For this purpose, a vertically depending mounting post 58 is provided at each fiberizing station, the post being connected with the fixed supporting structure 50 for the forehearth 51. The lower end of the post 58 (see FIGS. 7, 8, 9 and 10) carries a cylindrical sleeve 59 having its axis extended transversely to the forehearth and in a direction paralleling the bushing 52 associated with that fiberizing station. The sleeve 59 receives the trunnion 60 which is connected with the plate 61 which in turn carries the mounting plate 62 (see FIG. 9) for the frame structure 63 on which the fiberization equipment for the station is mounted. The plate 61 is provided with a projecting arcuate lug 64 received between the ears 65—65 which are integral with and carried by the sleeve 59 and which serve to mount the adjustment screws 66 by means of which the relative angular position of the mounting structure 63 for the fiberizing equipment may be angularly shifted about the axis of the sleeve 59 and trunnion 60. The plates 61 and 62 may be secured to each other in the desired adjusted position by means of the screws 67. Although the motion of the mounting structure or the blast generator 71, with its nozzle 55, and of the jet boxes 56 and the supply chamber 72, is angular about the axis of the sleeve 59 and trunnion 60, since the blast nozzle and jet boxes are spaced a substantial distance above the axis of the sleeve 59 and the trunnion 60, the motion of the blast nozzle and jet boxes, with respect to the bushing and the streams of glass is primarily a displacement motion toward and away from the glass bushing. Because of the mounting of the fiberizing equipment on the supporting structure 63, this sense of adjustment or control provides for shifting of the components 55, 56 and 57 unitarily toward and away from the streams of attenuable material being delivered from the bushing 52 at that fiberizing station.

Other mounting and control or adjustment arrangements are carried by the support structure 63 which appears in FIGS. 7 and 9. Thus, supporting framing 68 is mounted upon the support structure 63, preferably by guide means 69 providing for adjustment movement of the framing 68 in a direction toward the right or left when viewed as in FIG. 7. The framing 68 serves as a reaction point for the adjustable jack screws 70, by means of which the blast generator 71 (with which the blast nozzle 55 is associated) may be adjusted in the vertical sense. A gas supply chamber 72 for the jet boxes 56 is mounted upon the blast generator 71, as indicated diagrammatically at 73. This mounting may be a fixed mounting, but may alternatively incorporate adjustment devices for shifting the position of the supply chamber 72 and thus of the jet boxes 56 and the deflector 57 with respect to the jet generator 71 and also with respect to other components of the system, such as the glass supply means 52.

As diagrammed in FIG. 11, it will be seen that the movement of the supporting framing 68 with respect to the support structure 63 provides for shifting movement of the jet boxes 56 and the blast nozzle 55 toward and away from the glass bushing 52. This motion also carries with it the deflector 57 which is mounted upon the jet boxes 56. FIG. 11 also indicates two devices for shifting the framing 68 in the sense just referred to, one of these devices comprising a manual control diagrammatically indicated at 74, and the other comprising a fluid pressure piston and cylinder device 75, the manual control 74 and the piston and cylinder device 75 being coupled with the framing 68 in any appropriate manner providing for actuation either of the manual control or of the cylinder independently of each other.

It is now pointed out that as shown in FIG. 12, the supply chamber 72 has a supply connection 76. Also as seen in FIG. 12, the piston and cylinder device 75 is provided with a fluid connection 77 communicating with a control valve 78 which, also has a connection 79 communicating with the other end of cylinder 75. A local supply of operating fluid for the cylinder 75 is established in the reservoir 80 having a connection 81 with the valve device 78 and also having a connection 82 with the supply line 76 for the jet operating fluid.

A pressure sensor 83 is responsive to pressure in the jet supply connection 76 and controls the valve 78. The sensor 83 may comprise a pressure gauge and also includes a pressure responsive switch in the control circuit 83a for the solenoid 83b provided for operating the control valve 78. This pressure sensor 83 also serves to control the operating circuit 84a for the solenoid 84b provided for the shut-off valve 84, which shut-off valve is positioned in the connection 82 between the local supply reservoir 80 and the jet supply connection 76.

As above explained, particularly with reference to FIG. 11, the piston in the cylinder 75 is connected with the mounting for the blast generator and the jet boxes, and this operating connection is diagrammatically indicated in FIG. 12 by the dotted line 68a.

The control valve 78 has an exhaust connection 78e, and the valve is of the type which provides in one position (the position indicated in FIG. 12) for the supply of actuating fluid (for instance compressed air) from the local reservoir 80 to the supply connection 79, thereby maintaining the piston in the lower position when viewed as in FIG. 12, i.e., the position in which the blast generator and the jet boxes are moved toward the glass bushing. In this position of the control valve 78, the connection 77 to the lower end of the cylinder is vented to atmosphere through the connection 78e. This is the condition which is established by the solenoid 83b when the pressure sensor 83 senses normal pressure condition in the jet supply connection 76. Upon failure of the jet supply, or upon excessive drop in the jet supply pressure, the sensor 83, acting through the solenoid 83b, shifts the position of the control valve 78 so that the cylinder connection 79 is vented to atmosphere through the exhaust 78e; and at the same time, operating fluid from the reservoir 80 is delivered through the connection 81 to the cylinder connection 77, thereby moving the piston upwardly as viewed in FIG. 12, i.e., in the direction which will serve to withdraw the blast generator and the jet boxes away from the bushing. The valve 84 in the supply line 82 for the local reservoir 80 is also closed by its solenoid 84b at times when the pressure sensor 83 senses loss of pressure in the jet supply connection 76.

By this system, a local supply of operating fluid is always available to effect quick withdrawal of the blast and jet away from the glass bushing whenever the jet supply fluid is lost.

The purposes and advantages of the control arrangement just described will be understood when it is kept in mind that during normal fiberization operation, the blast generator 55, the jet manifolds 56 and particularly the jet deflector 57 (see FIGS. 7 and 11), are all positioned in close proximity to the streams of molten material issuing from the supply devices 36 associated with the bushing 52. Maintenance of the jet flow assures proper and stable feed of the streams of attenuable material; but if the jet supply pressure is dissipated or drops to an abnormally low value, the jet flow will no longer maintain the desired positional relationship between the deflector 57 and the streams of molten material, in consequence of which the molten material may fall upon the deflector, the jet manifolds or the blast generator which is undesirable and may even cause damage to these parts.

FIGS. 13 TO 21

Turning now to the embodiment of the equipment illustrated in FIGS. 13 to 21 inclusive, it is first pointed out that because of the high temperatures involved in operation of the feed of the molten material, bushings such as indicated at 52 may warp, after a substantial period of use, and such warping may occur either in a horizontal plane or in a vertical plane.

Warpage of the bushing as above referred to will tend to adversely affect the accuracy of the operating relationship between the deflector 57 and the series of stream supply tips 36. With this in mind, the embodiment of the equipment shown in FIGS. 13 to 21 inclusive provides a control system for regulating the operating interrelationship between the deflector 57 and the bushing, thereby compensating for warpage of the bushing.

As viewed in FIG. 13, it will be seen that a single deflection 57 extends throughout the entire dimension of a series of 5 side-by-side jet boxes or manifolds 56, each of which is connected with a supply chamber 111 having a supply line 112 associated therewith. The supply chambers 111 are mounted with freedom for limited guided movement in a direction toward and away from the bushing 52, for instance, by the spacer elements 113, and provision is made for effecting differential movement of at least the central three jet manifolds 56 along with their associated supply chambers 111. For this purpose, a pin 114 is associated with each one of the three intermediate supply chambers 111, the pin projecting upwardly for engagement in the obliquely inclined slot 115 formed in a strap 116, there being a separate transversely moveable strap 116 for each of the three intermediate jet supply chambers 111. The straps 116 extend beyond one end of the equipment as indicated at the top of FIG. 13 and at the right of FIG. 15, and each strap has an apertured angled end 117 associated with the screw 118, nuts being provided on the screw for separate positioning of each of the straps 116. In this way, the position of the supply chambers 111 and the individual connected jet manifolds 56 may be differentially adjusted in a horizontal plane, in the sense illustrated by the diagram of FIG. 21.

Figure 21:
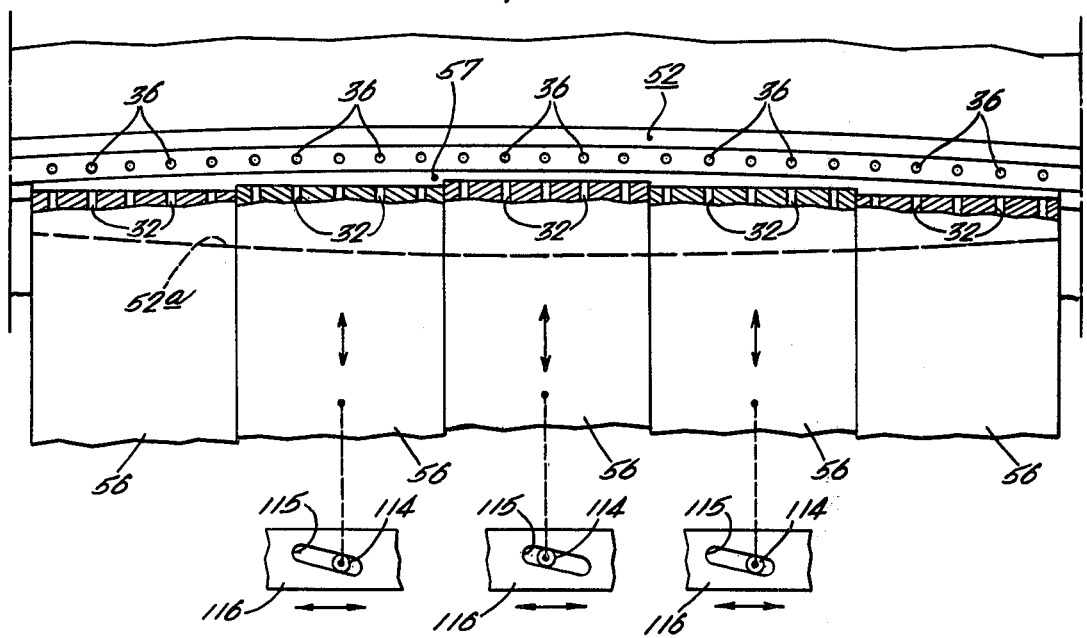

FIG. 21 indicates a warped condition of the bushing 52 which is represented by the upwardly curved configuration of the row of supply tips 32 when viewed as in FIG. 21, and it will be seen from FIG. 21 that the jet manifolds may be forced to positions causing a slight flexure of the deflector strip 57. It will be understood that the condition represented in FIG. 21 is greatly exaggerated and that the deflector can be flexed to only a very minor extent. The jet manifolds may also be adjusted in the opposite sense in order to compensate for warpage of the bushing in a horizontal plane but in the opposite direction from that illustrated in full lines in FIG. 21. This opposite sense of warpage is indicated by the dash line 52a in FIG. 21, it being noted again that the magnitude of the warpage indicated in FIG. 21 has been exaggerated for the purposes of illustration.

Provision is also made for differential displacement of the three intermediate jet manifolds 56, in order to compensate for warpage of the bushing in a vertical plane. For this purpose, each supply chamber 111 is provided with U-shaped channels or brackets 119 adapted to receive the eccentric actuators 120 which are mounted on transverse shafts 121 the rotative position of which is adjustable by screw devices 122, so that the three intermediate jet manifold boxes may be shifted slightly upwardly or downwardly, thereby effecting some flexure of the deflector strip 57, in order to compensate for bushing warpage in the vertical plane. This sense of control or adjustment is illustrated in the diagram of FIG. 20, and here again it is to be noted that the extent of warpage of the bushing as shown is greatly exaggerated merely for the purpose of illustration. The devices 119 and 120 may be used to differentially shift the jet manifold boxes upwardly as is indicated in full lines in FIG. 20 or may be used to differentially move the jet manifold boxes downwardly, for instance, as suggested by the dash line 52b.

It should be understood that if desired a means for flexing a jet deflector as described above with reference to FIGS. 13 to 21 may also be incorporated in an arrangement such as shown in FIGS. 7 to 12.

FIG. 22

In the embodiments described above with reference to FIGS. 1 to 21, the fiberizing centers each include four components, namely, a blast generator, a device for establishing a jet penetrating the blast, a means positioned along the path of the jet developing a stable low pressure zone, and a glass supply means arranged to deliver a stream of glass in attenuable condition into the low pressure zone of the jet. All of these first three embodiments also include mounting means incorporating at least one adjustable device for altering the position and operation of the means for establishing a stable low pressure zone in the jet with respect to at least one of the other components. Thus, each of the first three embodiments includes an adjustable device for altering what might be termed the "relative functional position" of the means for developing the stable low pressure zone, with respect to at least one of the other components of the fiberizing center.

Figure 22:
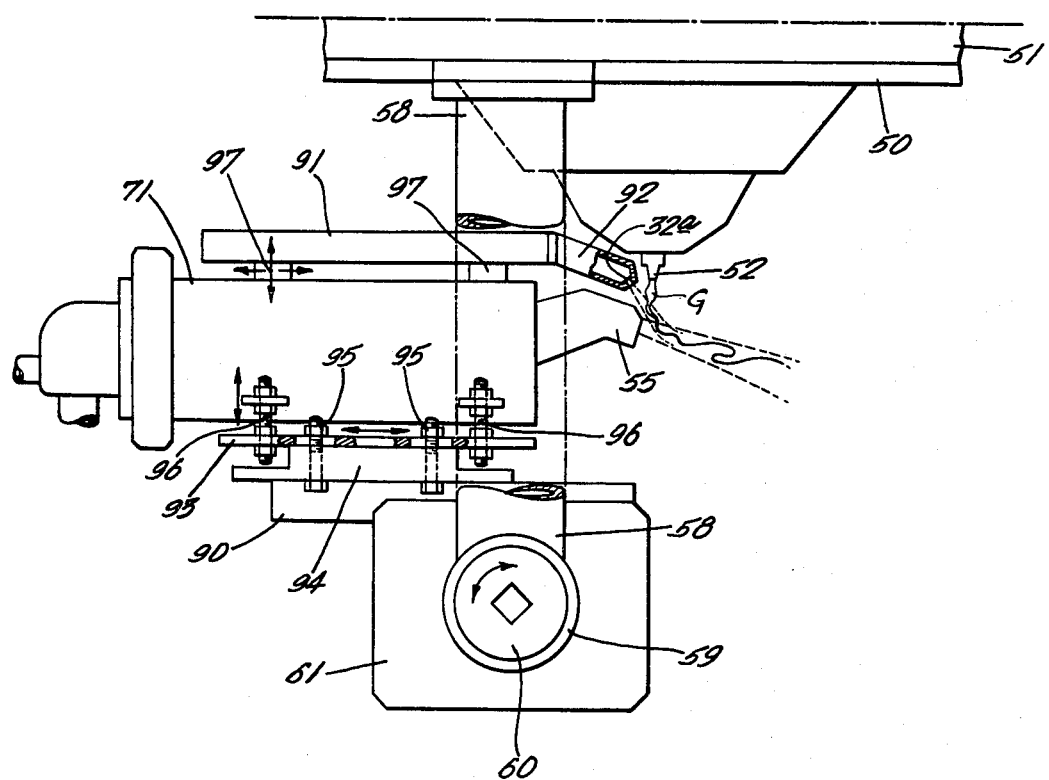
FIG. 22 illustrates certain controls in a fourth embodiment.

In contrast with the first three embodiments, the embodiment of FIG. 22 does not include the component, such as a deflector or similar element positioned along the path of the jet, for developing the stable low pressure zone in the jet. The embodiment of FIG. 22 thus discloses fiberizing centers incorporating three components, rather than four components. In the arrangement of FIG. 22, various control devices similar to some of those described above have been incorporated and include at least one adjustable device for altering the relative position and operation of at least one of the three components with respect to at least one of the other two components.

It is of particular importance in connection with the embodiment of FIG. 22 that provision is made for altering the relative functional position of at least one of the components with respect to at least one of the other two components in a plane containing the axes of the jet and glass admission orifices.

Certain parts of the embodiment of FIG. 22 are the same as or similar to those in earlier embodiments, particularly as shown in FIGS. 7 to 12 inclusive. Thus, a vertical supporting post 58 is illustrated in FIG. 22 as dependent from the structure 50, providing for supporting the forehearth and the associated bushing 52. As described above, particularly with reference to FIGS. 7, 9 and 10, the post 58 is provided at its lower end with a sleeve 59 for the trunnion 60 which, in turn, adjustably supports the plate 61 in the manner already described above. A supporting framing 90 may be carried by this mechanism, the framing 90 serving to support the blast generator 71 and also the jet supply manifold 91 and the jet boxes 92. The jet boxes 92 may be of construction similar to that described above with reference to FIG. 7a; but in FIG. 22, no deflector such as shown at 57 in FIG. 7a is employed, and the jet orifices 32a in FIG. 22 are somewhat differently positioned and oriented so as to deliver jets downwardly in inclined paths below the glass orifices of the bushing 52. The jets penetrate the blast, as in the other embodiments, and air or ambient gas induced by the jets cause the glass streams to enter the jets, the streams being carried thereby into the zones of interaction in the blast in order to effect the desired attenuation in the manner disclosed in our copending application Ser. No. 676,755, above identified. Alternatively, the components of the fiberizing center may be relatively positioned in the manner disclosed in our prior U.S. Pat. No. 4,015,964, above identified, according to which the stream of glass directly enters the zone of interaction between the jet and the blast, instead of being carried by the jet flow into the blast.

A mounting plate 93 is shown as carried by the support 94, the mounting plate having slotted apertures cooperating with screw devices 95 for fastening the plate to the support 94. This arrangement provides for mounting the blast generator 71 so that it may be moved to different positions in a direction horizontally toward and away from the glass bushing. This mounting arrangement may provide alternatively for securing the blast generator in a given position or for freedom for movement in accordance with operating conditions, for example, in the manner described above with reference to FIG. 11.

The arrangement described just above is similar to that described with reference to FIG. 7 and it is to be understood that a manual and automatic adjustment mechanism such as shown in FIG. 11 is preferably included in the embodiment of FIG. 22 in order to provide for adjustment of the position of the jet boxes and blast generator toward and away from the axes of the glass orifices. Thus, it is contemplated in the embodiment of FIG. 22 that this control may be manually adjusted or may be automatically operated in response to malfunctioning of the jet supply, as described above with reference to FIG. 12.

Screw jack devices 96 mount the blast generator 71 on the plate 93 and provide for vertical adjustment of the position of the blast generator.

The jet supply chamber 91 and the connected jet boxes 92 are desirably mounted on the blast generator 71 by means of devices 97, similar to those described above with reference to FIG. 7, which may provide either for fixed positioning of the jet supply device with reference to the blast generator, or may include adjustable means for shifting the position of the supply chamber 91 either vertically or horizontally (or both) with respect to the blast generator.

In connection with the embodiment of FIG. 22, it is further pointed out that, in common with the embodiment of FIGS. 7 to 12, the equipment at the fiberizing centers is connected with and mounted upon the structure supporting the glass supply means. This common support for both the glass supply means and the glass fiberizing equipment is advantageous in facilitating the establishment of the desired interrelation between the fiberizing equipment and the bushing or bushings from which the glass streams are delivered at the fiberizing centers.

In connection with the various embodiments disclosed, it is to be understood that the specific mechanisms for effecting control in the various senses may be replaced by other devices performing the same functions.

We claim:

1. Apparatus for forming fibrous blanket comprising a perforated fiber collecting conveyor moving in a generally horizontal path, fiber forming mechanism located above the path of the collecting conveyor and comprising a series of fiberizing centers in a plurality of spaced positions along the path of the conveyor, each center including a supply means for delivering a downwardly directed stream of molten thermoplastic attenuable material, and each center including means for effecting gaseous attenuation of the streams of molten material comprising means for generating a gaseous blast and means for generating a gaseous jet, the blast generating means being directed in a downwardly inclined path, and the jet being of smaller cross section than the blast and having higher kinetic energy per unit of volume than the blast and penetrating transversely thereof, and mounting mechanism for the blast and jet generating means including means providing for positioning the jet in the path of a stream of molten material and providing for delivery of the blast and jet in various relatively inclined paths both directed downwardly toward the path of the fiber collecting conveyor.

2. Apparatus as defined in claim 1 in which the mounting mechanism for the blast and jet generating means comprises common mounting means for said blast and jet generating means providing for conjoint movement thereof to deliver the blast and jet in various different paths directed downwardly toward the fiber collecting conveyor.

3. Apparatus as defined in claim 1 or claim 2 in which the mounting mechanism for the blast and jet generating means further includes means providing for conjoint movement of the blast and jet generating means toward and away from the stream of molten material.

4. Apparatus for forming fibrous blanket comprising a perforated fiber collecting conveyor moving in a generally horizontal path, fiber forming mechanism located above the path of the collecting conveyor and comprising a series of fiberizing centers in a plurality of spaced positions along the path of the conveyor, each center including a supply means for delivering a downwardly directed stream of molten thermoplastic attenuable material, and each center including means for effecting gaseous attenuation of the streams of molten material comprising means for generating a gaseous blast in a downwardly inclined path, and means for generating a gaseous jet, the jet being of smaller cross section than the blast and having higher kinetic energy per unit of volume than the blast and penetrating transversely thereof, and mounting mechanism for the blast and jet generating means including means providing for positioning the jet in the path of a stream of molten material and providing for delivery of the blast in a downwardly inclined path toward the fiber collecting conveyor in various differently spaced positions with respect to the stream of molten material.

5. Apparatus as defined in claim 4 in which the mounting mechanism includes means mounting the blast and jet generating means for conjoint movement toward and away from the stream of molten material.

6. Apparatus as defined in claim 4 or in claim 5 in which the mounting mechanism includes means providing for relative movement of the blast generating means and the jet generating means in directions toward and away from each other.

7. Apparatus as defined in claim 1 or claim 4 in which the mounting mechanism for the blast and jet generating means further includes means providing for variation of the vertical spacing of the blast and jet generating means above the fiber collecting conveyor.

* * * * *